Patented Apr. 17, 1945

2,374,137

UNITED STATES PATENT OFFICE 2,374,137

CONTROLLED HEATING OF POLYAMIDES

Leroy Frank Salisbury, Wilmington, Del., assignor to E. I. du Pont de Nemours & Company, Wilmington, Del., a corporation of Delaware No Drawing. Application April 11, 1941,
Serial No. 388,185

8 Claims. (Cl. 260—78)

This invention relates to polymeric materials and more particularly to the manufacture of new polymeric materials from mixed synthetic linear polyamides, the said polyamides being of types such as identified hereinafter. For convenience, generic reference to the said types will be made at times by denominating them simply as polyamides, which term will be intended, as well, to comprehend the interpolymers mentioned hereinafter.

The synthetic linear polyamides used in the practice of this invention are of the general type described in patents, 2,071,250, 2,071,253, 2,130,523, and 2,130,948. The polymers there described are high molecular weight products which are generally crystalline in structure showing X-ray powder diffraction patterns in the massive state, and which are capable of being cold drawn into fibers showing by characteristic X-ray patterns molecular orientation along the fiber axis. For the best fiber-forming properties the polymerization reaction should be continued until the intrinsic viscosity is at least 0.4.

These polyamides, generally speaking, comprise the reaction product of a polyamide-forming composition in which the molecules are bifunctional and contain two amide-forming groups, each of which is complementary to an amide-forming group in other molecules in said composition.

These polyamides as defined above or as otherwise identified hereinafter can be obtained, for example, by self-polymerization of monoamino-monocarboxylic acids, or by reacting a diamine with a dibasic carboxylic acid in substantially equimolecular amounts, it being understood that reference herein to the amino acids, diamines, and dibasic carboxylic acids is intended to include the equivalent amide-forming derivatives thereof. Amide-forming derivatives of the amino acids include the ester, anhydride, amide, lactam, acid halide, N-formyl derivatives, carbamate, and nitrile in the presence of water. Amide-forming derivatives of the dibasic carboxylic acids comprise the mono- and di-ester, the anhydride, the mono- and di-amide, acid halide, and the following compounds in the presence of water: nitrile, cyanocarboxylic acid, cyanoamide, and cyclic imide. Amide-forming derivatives of the diamines include the carbamate, N-formyl derivative and the N,N'-diformyl derivative.

These linear polyamides include also polymers obtained by admixture of other linear polymer-forming reactants, as for instance glycols in the case of polyester amides, with the mentioned polyamide-forming reactants. In either instance the amide group is an integral part of the main chain of atoms in the polymer, and, in the case of the preferred polyamides, the average number of carbon atoms separating the amide groups is at least two. It should be noted, however, that the ratio of amide groups to other carbon-noncarbon linkages in the polymer chain should be at least 1:20 if the products are to exhibit polyamide properties to a significant degree.

On hydrolysis with hydrochloric acid the amino acid polymers yield the amino acid hydrochloride, and the diamine-dibasic acid polymers yield the diamine hydrochloride and the dibasic acid.

Although the fiber-forming polyamides are preferred, this invention may also be practiced with the lower molecular weight polyamides obtained from selected reactants or by stopping the polymerization reaction before the fiber-forming stage is reached.

Evidence appears to show that when mixtures of two or more per se polyamide-forming ingredients (e. g., diamine-dibasic acid combinations or amino acids) are interpolymerized, to form a true interpolymer, the structural units corresponding to the different starting ingredients are present in the resulting interpolymers in a random arrangement. For instance, interpolymers so formed have surprisingly low melting points; so low, in fact, as not only to be lower than the average melting points of the polyamides formed by separate polymerization of the polyamide-forming ingredients, but also, frequently, lower than the melting points of any of the individual polyamides formed by separate polymerization of the said polyamide-forming ingredients. True polyamide interpolymers, moreover, usually are more pliable and more soluble than the simple polyamides produced from the corresponding component ingredients.

It is known to form polyamide mixtures, as distinguished from the aforesaid true interpolymers, by physically mixing two separately preformed polyamides. These mixtures characteristically have melting points lying quite close to that of the higher melting component; but it is possible to effect mutual separation of their component polyamides—at least in substantial part, and often completely—by purely physical means; this possibility constituting, in fact, a serious disadvantage in many fields of use.

Although the respective properties possessed by the aforesaid polyamide mixtures, as well as those possessed by the true interpolymers, make these two classes of polyamides respectively quite suitable, nevertheless, for many technical applications, there are a number of important functions for which neither is well adapted. To illustrate: Substitution of a true interpolyamide for a mixture of two pre-formed polyamides, for the purpose of obtaining superior pliability and softness without entailing the aforesaid disadvantage of separability, involves substantial sacrifice of melting point. Wherefore, a formidable need exists for a method of achieving the desired pliability and softness without incurring to any great extent the disadvantages of either the said separability or the said sacrifice of melting point.

This invention has as an object, therefore, the fulfillment of the said need. More particularly, this invention has as an object the production of compounded polyamide products having higher melting points and greater hardness and stiffness than true interpolymers formed from the same component ingredients as those going into the make-up of the polyamides to be compounded, and yet being free from the aforesaid capacity for mutual separation through purely physical means. Still further objects will appear either expressly or impliedly hereinbelow.

These objects are accomplished, in accordance with the invention, by subjecting a mixture of pre-formed polyamides to prolonged heating in the molten state at amide-forming temperatures, under controlled conditions, in the manner hereinafter described. The invention is practiced by heating, at a temperature between 180° and 320° C., a substantially anhydrous melt comprising a plurality of preformed polyamides until the melting point of the resulting product is lower than the initial melting point of the mixture of the said polyamides heated just sufficiently to obtain a single liquid phase, but higher than the melting point of the corresponding true interpolymer (formed from the initial polyamide-forming ingredients of the said preformed polyamides).

The invention also comprises the compositions thus obtained.

In the most preferred practice of the invention, at least one of the said polyamides is of the fiber-forming type, i. e., is capable of being cold-drawn into fibers showing by characteristic X-ray patterns orientation along the fiber axis, such capability being dependent, as a rule, on the possession of an intrinsic viscosity (as defined in U. S. P. 2,130,948) of at least 0.4—and has a melting point above 180° C., and the said heating is continued for at least one hour, and usually until the melting point of the product is depressed at least 15%, but not more than 90%, of the difference between the initial melting point of the molten mixture of the said polyamides heated just sufficiently to obtain a single liquid phase, and the melting point of the corresponding true interpolymer.

While the controlled heating of the invention may advantageously be applied to polyamides mixed in any proportions, so long as fusion of the ingredients is accomplished and the melt is heated at amide-forming temperatures—but not so high as to cause rapid destructive decomposition of the starting material—as a rule not over 95% of the fused mixture should consist of any single component polyamide. The upper temperature limit generally is approximately 320° C., but for best results, as regards both facility of operation and quality of product, it is preferably 220°–300° C. It is desirable also to subject the melt to thorough mixing during the heating.

As the heating is continued, progressive changes occur in the physical properties of the material. For example, the melting point approaches (though very slowly) the melting point of the corresponding true interpolyamide. The rate and extent of the lowering of the melting point is proportional to the difference between the melting point of the initial blend and the melting point of the corresponding true interpolymer, and consequently varies in accordance with the particular compositions employed. The reaction products also become softer, more pliable and more soluble, at rates and to extents dependent on the particular compositions employed, and likewise approach, as regards these properties, the character of the corresponding true interpolymer. By controlling the time of heating and the temperature, products having the desired properties intermediate between those of the polyamide mixture and the true interpolymer can be obtained. The products of this invention will be referred to as "semi-interpolymers."

The polymeric components of the reaction product become substantially inseparable by physical means, at a relatively early stage of the heating schedule. For instance, if only one component is soluble in a selective solvent per se, it ordinarily will be found impossible, after about one hour's heating at 285° C., to remove selectively more than five per cent, or in fact any significant portion, of that component by extraction with this solvent. In any case, the controlled heating of the invention is continued at least until the point where substantial physical inseparability results. It has been found that this point generally coincides with the point where the melting point has been lowered, as aforesaid, 15% of the difference between the melting point of the initial physical homogeneous blend and the melting point of the corresponding true interpolymer. It may be observed, in this connection, that the requisite duration of the heating depends upon the temperature employed, since time and temperature have an inter-related influence on the nature of the product, both intermediately and ultimately. The process characteristically requires at least one hour and preferably two hours—especially at the lower operable temperature ranges—for the accomplishment of the said degree of lowering of the melting point. The terminating of the heating before the lowering of melting point has progressed more than 90% of the aforesaid difference between the melting point of the initial homogeneous blend and the melting point of the corresponding true interpolymer, is essential to the avoidance of too great a sacrifice not only of the melting point but also of the other properties of the products.

The initial pre-formed polyamides may be prepared by heating a salt of a dibasic acid and a diamine, or by other methods such as are well known to the art, e. g., as described in U. S. P. 2,130,948, or by polymerizing an amino acid or an amide-forming derivative thereof as described in U. S. P. 2,071,253. True interpolymers also are operable as starting materials in the practice of the invention, and are considered herein to be included in the term "polyamides." They may be prepared by using more than one polyamide-forming composition, e. g., a mixture of diamine-dibasic acid salts or of polymerizable amino acids as described in U. S. P. 2,071,253, 2,130,948, and in the pending application of W.

H. Carothers, Serial No. 230,724, filed September 19, 1938, and assigned to the assignee hereof.

The practice of this invention is illustrated in the following examples, in which the parts are given by weight.

EXAMPLE I

Sixty-five parts of fiber-forming polyhexamethylene adipamide (M. P. 255° C.) in the form of small chips and 35 parts of pulverized polymerized epsilon-caprolactam (M. P. 205° C.) are placed in a vessel from which atmospheric oxygen is exhausted by successive evacuations and admission of oxygen-free carbon dioxide. The filled vessel is then heated in a bath of boiling dibenzofurane vapor (285° C.) which effects complete fusion of the contents. The molten mass is stirred continuously while heating is continued for one hour. The product thus obtained is substantially inseparable into its polymeric components by physical means. Heating is then continued for further periods of time, resulting in further distinctive changes in the properties of the product. The relationship of the physical properties of the product to the total time of heating is set forth in the table below. In the table, the hardness of the product is expressed as the force in grams required to imbed a polished quartz sphere to a uniform depth in a flat polished specimen of the material after it has been conditioned at 25° C. and 50% R. H. The stiffness is determined on hot-pressed pellicles of the material, after the same have been thoroughly oriented by cold-working and finally set by immersion in boiling water for 15 minutes.

TABLE I

*Dependence of semi-interpolymer properties on the duration of heating*

| Duration of heating at 285° C., in hrs. | Melting point, ° C. | Melting point lowering in terms of difference between melting point of initial mixture and that of interpolymer, per cent | Hardness | Stiffness modulus, lb./sq. in. |
|---|---|---|---|---|
| 0 (melt blend heated just to homogeneity; included for comparison) | 234 | (0) | 110 | 0.15×10⁶ |
| 1 | 228 | 13 | 91 | 0.068×10⁶ |
| 2 | 223 | 23 | 76 | |
| 4 | 210 | 50 | | 0.057×10⁶ |
| 8 | 198 | 75 | 61 | 0.053×10⁶ |
| Interpolymer of hexamethylenediammonium adipate (65 parts) and epsilon-caprolactam (35 parts) (included for comparison) | 186 | (100) | 60 | 0.042×10⁶ |

EXAMPLE II

A mixture comprising 60 parts of fiber-forming polyhexamethylene adipamide (M. P. 255° C.) and 40 parts of fiber-forming polyhexamethylene sebacamide (M. P. 215° C.) is heated as described in Example I at 285° C. for 3 hours. The product obtained has a melting point of 228° C. in contrast with a melting point of 236° C. for the initial homogeneous mixture of the components and in contrast with a melting point of 211° C. possessed by the corresponding true interpolymer formed by interpolymerization of hexamethylenediammonium adipate (60 parts) and hexamethylenediammonium sebacate (40 parts). Thus, the melting point is lowered 32% of the difference between the melting point of the initial mixture and that of the true interpolymer. The melting point of the product is lowered a further degree, to 227° C., by heating an additional hour at 287° C.

EXAMPLE III

A mixture of 65 parts of polyhexamethylene adipamide (M. P. 255° C.; intrinsic viscosity 0.9) and 35 parts of the interpolymerization product of hexamethylenediammonium adipate (40%) with epsilon-caprolactam (60%), which interpolymerization product has a melting point of 155° C., is heated in an autoclave. The schedule of heating involves a gradual increase of temperature followed by a period of constant temperature, as follows: The initial temperature is 25° C. After 1.55 hours, the mixture is at 155° C., causing the fusion of the lower-melting component. After an additional 0.42 hour, the temperature is 180° C. and 0.85 hour later the temperature is 255° C., causing the complete fusion of the mixture. During 0.43 hour, the mixture is stirred and the temperature is raised to 280° C. and maintained at that point for 1.5 hours. The autoclave contents are then rapidly cooled. The melting point of the resulting semi-interpolymer is 218° C. In contrast with this figure, the initial melting point of a blend of the same components in the same proportion, heated just until they form a single liquid phase, is 235° C. The melting point of a true interpolymer of the corresponding composition (made from 80% hexamethylenediammonium adipate and 20% epsilon-caprolactam) is 205° C. Thus, the heating schedule to which the polymers were subjected, 2.78 hours of which was in the range of amide-forming temperatures (above 180° C.), reduced the melting point of the composition by an amount equivalent to 57% of the difference between the melting point of the initial blend and the corresponding true interpolymer.

EXAMPLE IV

Forty parts of N-methylpolytriglycol adipamide and 60 parts of the interpolymerization product of hexamethylenediammonium adipate (40%), hexamethylenediammonium sebacate (30%), and epsilon-caprolactam (30%) are dissolved in a mixture of 100 parts of chloroform and 100 parts of methanol. The solvent is then evaporated at 60° C. by the application of diminished pressure. The resulting composition (Table II, No. 1) is a pasty, semi-solid mass. In demonstrating the substantial lack of chemical union between the polymeric components of this mixture, advantage is taken of the fact that the former (which is a liquid at room temperature) is soluble in water and that the latter (softening point, 160° C.) is insoluble in water. In the test for chemical union, a weighed pellicle of the composition is allowed to stand in water at room temperature for 3 days. At the end of this time it is dried to constant weight. The substantially complete extractability of the soluble component is evident from the loss of weight (see Table II, below). The softening point of the extraction residue indicates that it is the water-insoluble component in unchanged form.

Semi-interpolymers, in which chemical union between the polymeric components is partially or almost entirely complete, are formed by heating portions of this physical mixture in an atmosphere of nitrogen for various periods of time at temperatures of 202° C. or 285° C. as indicated in Table II. With respect to the properties of the product, it will be observed that (1) the degree to which physical separability is diminished is approximately proportional to the duration of heating and to the temperature of heating, and (2) the softening point of the semi-interpolymer is reduced concurrently with the diminution of the physical separability. Supplementary evidence for the formation of semi-interpolymers is furnished by the nature of the extraction residue. In the case of the initial physical mixture (No. 1), the residue consists of the original water-insoluble ingredient unchanged in softening point. The extraction residues obtained from compositions which have been subjected to heating at amide-forming temperatures possess lower softening points, which is indicatory of the chemical union therein of segments of water-soluble polyamide.

temperature at which amide formation occurs at an appreciable rate. Under conventional conditions, therefore, the process of the invention is conducted between that temperature and the temperature at which the ingredients undergo deleterious pyrolytic degradation. It may be observed that although the upper limit ordinarily is near 320° C., the crucial factor is the avoidance of a temperature level at which pyrolysis would become appreciable. If oxygen is not excluded, the heated polyamides are degraded oxidatively at a considerably lower temperature, but the process is not limited to temperatures below that at which this reaction occurs, since it is preferred to exclude oxygen.

It is significant that the dependence of the properties of the products upon the temperature and duration of heating is so great that substantially the same effect generally may be

TABLE II

*Properties of semi-interpolymers formed by heating mixtures of polyamides above 180° C.*

DETERMINATION OF PHYSICAL SEPARABILITY

| Heating schedule | Softening point, °C. | Initial weight, parts | Weight after extraction, parts | Weight loss, per cent of whole | Weight loss, per cent of soluble component | Softening point of extraction residue, °C. |
|---|---|---|---|---|---|---|
| (1) None | 127 | 28.6 | 11.7 | 39 | 98 | 160 |
| (2) 1 hr. at 202° C | 118 | 47.2 | 33.5 | 29 | 73 | 140 |
| (3) 4 hrs. at 202° C | 106 | 26.7 | 20.0 | 25 | 63 | 137 |
| (4) 0.5 hr. at 285° C | 105 | 29.0 | 22.0 | 24 | 60 | 129 |
| (5) 4 hrs. at 285° C | | 33.1 | 32.4 | 2 | 5 | |

In addition to the polymers used in the foregoing examples, the following fiber-forming polyamides melting above 180° C. may be used: Polytetramethylene adipamide, polytetramethylene suberamide, polytetramethylene sebacamide, polyoctamethylene adipamide, polydecamethylene p-phenylenediacetamide, poly-p-xylylenediamine sebacamide, polyhexamethylene beta-methyladipamide, and polyhexamethylene gamma, gamma'-thiodibutyramide. Further examples of useful fiber-forming polyamides are the interpolymerization products of the following mixtures of polyamide-forming ingredients: Hexamethylenediammonium adipate and tetramethylenediammonium adipate; hexymethylenediammonium adipate and hexamethylenediammonium sebacate; hexamethylenediammonium adipate and hexamethylenediammonium gamma, gamma'-thiodibutyrate, hexamethylenediammonium adipate and triglycoldiammonium adipate containing at least 40% of the former; and hexamethylenediammonium adipate and hexamethylenediammonium diglycolate containing at least 70% of the former. Any desired proportions of the polymeric ingredients may be employed.

As the complementary component or components there may be used any synthetic linear polyamide, including those which are not fiber-forming and those bearing substituents on the amide nitrogen atoms, e. g., the polyamides derived by reaction of N,N'-dimethylhexamethylenediamine or N,N'-dimethyltriglycoldiamine with adipic acid. In general, however, it is desirable to select as the complementary component a polyamide having an intrinsic viscosity of at least 0.2.

The reason for specifying 180° C. hereinabove, as the lower limit for the heating temperature, is not merely empirical; it rests on the fact that 180° C. corresponds approximately to the lowest obtained in two hours at 260° C., as requires eight hours at 220° C. When the heating is greatly prolonged, especially at the higher operable temperatures, it is possible ultimately to approach a product which resembles the corresponding true interpolyamide in properties such as melting point; but excessive lowering of melting point being undesirable, especially in the case of materials to be fabricated into fibers or other textile products, the heating should be stopped short of the point at which the properties resemble those of the said true interpolyamide. The actual extent of melting point lowering, under any given set of conditions, appears to depend upon the difference between the melting point of the initial mixture and that of the corresponding true interpolymer. Hence the hereinabove set forth preference for those temperatures and durations of heating which produce a melting point lowering of at least 15% and not more than 90% of the difference between the melting point of the initial melt and that of the corresponding true interpolymer.

While agitation of the ingredients is not a necessary part of the process of the invention, it is advantageous to mix the melt thoroughly during the heating, especially since the polyamides ordinarily are too viscous to mix spontaneously by diffusion. Conventional methods of mechanical stirring or pumping will be found useful for this purpose. The process is not limited to any particular technique, special apparatus, or unusual operating conditions, however, and either atmospheric, subatmospheric, or superatmospheric pressure may be employed.

One of the most surprising, as well as the most significant, aspects of the invention consists in the discovery that the prolonged heating of the mixed polyamides, even for many hours, not only is not necessarily detrimental to them, but actually may be of advantage (this, despite the impression generally prevalent heretofore that such prolonged heating had or necessarily would have a deleterious effect on the polyamides).

Reference has been made hereinabove to the evidential probability that the structural units of the true interpolymer molecule are present in a random arrangement. The said structural units consist, apparently, of the radicals, or their residues, of which the monomeric constituents of the interpolymer were constituted. It is probable, accordingly, that an interpolymer derived, for instance, from hexamethylenediamine, octamethylenediamine, azelaic acid, and sebacic acid would have a random arrangement of the various diamine-dibasic acid combinations which, in terms of the number of consecutive carbon atoms in the successive structural units linked by the recurrent amide groups, might be somewhat as follows:

—6–9/6–10/8–9/8–10/8–9/6–10—

On the other hand, the evidence may be interpreted as indicating that in the case of the products of the invention successive segments of appreciable length exist wherein the constituents are arranged in non-random or orderly sequence. For instance, it appears probable that the application of the instant invention to a mixture of polyhexamethylene azelamide and polyoctamethylene sebacamide yields a product which, in terms of the number of consecutive carbon atoms in the structural units linked by the recurrent amide groups, might be somewhat as follows:

—6–9/6–9/6–9/8–10/8–10/8–10—

It may be observed, in the present connection, that since amide-forming temperatures have been found to be requisite for the successful practice of the invention, amide interchange may account, at least in large part, for the results obtained. The applicant wishes to point out, however, that he does not intend to be bound by the accuracy of this or any other theoretical observation or speculation contained herein.

The special utility of the polyamide products of this invention may be regarded as depending upon their possession of the more advantageous characteristics of interpolymers, e. g. the inseparability of the polymeric components, while having in addition significantly greater stiffness and hardness, as well as higher melting points than interpolymers. This invention thus makes it possible to combine the useful properties of two polymers with relatively minor losses in the characteristics principally desired. For example, a polyamide possessing a high melting point may be treated in accordance with this invention by heating it with a small proportion of a somewhat lower melting but more soluble, flexible, or resilient polyamide. The beneficial properties of the latter polyamide are thus imparted to a large extent to the resultant product, without entailing deleterious sacrifice of the high melting point advantage of the former polyamide. It is important to note that a high melting point, i. e., above a more or less fixed minimum value, is often critically important for textile uses where the material must withstand those temperatures which are employed in textile practice, e. g. for ironing and calendering. For this reason it is desirable that at least one of the preformed polyamides melt above 180° C.

A further unique advantage in the process of the invention consists in the fact that it permits the modification of low-cost polymers with a minimum amount of higher cost polymers having special properties. This advantage arises principally from the inseparability of the components, which results in the retention of all, or at least all but five per cent or less, of the more expensive component, during the physical operations of processing, or, in fact, during the application of any known methods for effecting physical separation operative in the case of the initial mixtures.

The semi-interpolymers of this invention can be used in much the same manner as the previously described synthetic linear polyamides. Typical uses are in the preparation of filaments, bristles, fabrics, films, safety glass interlayers, adhesives, molded articles and coating compositions. In general, the semi-interpolyamides are more pliable than the polyamides from which they are prepared and, in the case of semi-interpolymers prepared from polyamides having different solubility characteristics, have a greater affinity for dyes than the less soluble of the original polyamides.

As many apparently widely different embodiments of this invention may be made without departing from the spirit and scope thereof, it is to be understood that I do not limit myself to the specific embodiments thereof except as defined in the appended claims.

I claim:

1. A process for obtaining an improved polyamide composition from a mixture of a plurality of different preformed synthetic linear polyamides at least one of which has an intrinsic viscosity of at least 0.4 and a melting point above 180° C., each of said preformed polyamides being one which on hydrolysis with hydrochloric acid yields substances of the class consisting of (a) monoaminomonocarboxylic acid hydrochlorides and (b) mixtures of diamine dihydrochloride and dibasic carboxylic acid, which process comprises heating continuously under substantially anhydrous conditions a molten mixture of said different preformed polyamides at amide-forming temperatures below that at which destructive decomposition occurs and prolonging the heating for at least one hour under said anhydrous conditions until the melting point of the resulting product is depressed at least 15% but not more than 90% of the difference between the initial melting point of said mixture and that of the corresponding true interpolymer thereby obtaining a product which is substantially inseparable by physical means into its polymeric components.

2. A process for obtaining an improved polyamide composition from a mixture of a plurality of different preformed synthetic linear polyamides, at least one of which has an intrinsic viscosity of at least 0.4 and a melting point above 180° C., each of said preformed polyamides being one which on hydrolysis with hydrochloric acid yields substances of the class consisting of (a) monoaminomonocarboxylic acid hydrochlorides and (b) mixtures of diamine dihydrochloride and dibasic carboxylic acid, which process comprises heating continuously under substantially anhydrous conditions a molten mixture of said different preformed polyamides at a temperature between 180° C. and 320° C. and prolonging the heating for at least one hour under said anhydrous conditions until the melting point of the resulting product is depressed at least 15% but not more than 90% of the difference between the initial melting point of said mixture and that of the corresponding true interpolymer thereby obtaining a product which is substantially inseparable by physical means into its polymeric components.

3. The process set forth in claim 1 wherein the said heating is conducted within the range 220° C. and 300° C.

4. The product formed in accordance with the process set forth in claim 1.

5. An improved polyamide composition comprising the product obtained by heating continuously under substantially anhydrous conditions a molten mixture of at least two different preformed synthetic linear polyamides at a temperature between 180° C. and 320° C. and for at least one hour until a product is obtained which is substantially inseparable by physical means into its polymeric component, at least one of said preformed polyamides having an intrinsic viscosity of at least 0.4 and a melting point above 180° C., and each of said preformed polyamides being one which on hydrolysis with hydrochloric acid yields substances of the class consisting of (a) monoaminomonocarboxylic acid hydrochlorides and (b) mixtures of diamine dihydrochloride and dibasic carboxylic acid, the melting point of said product being depressed at least 15% but not more than 90% of the difference between the initial melting point of said mixture and that of the corresponding true interpolymer.

6. The polyamide composition set forth in claim 5 in which said preformed polyamide having an intrinsic viscosity of at least 0.4 and a melting point above 180° C. is polyhexamethylene adipamide.

7. The polyamide composition set forth in claim 5 in which said preformed polyamides comprise polymerized epsilon-caprolactam and fiber-forming polyhexamethylene adipamide having an intrinsic viscosity above 0.4 and a melting point above 180° C.

8. The polyamide composition set forth in claim 5 in which said preformed polyamides comprise fiber - forming polyhexamethylene adipamide and fiber-forming polyhexamethylene sebacamide, each of said polyamides having an intrinsic viscosity above 0.4 and a melting point above 180° C.

L. FRANK SALISBURY.